United States Patent Office 3,437,620
Patented Apr. 8, 1969

3,437,620
DYEABLE POLYPROPYLENE FIBERS CONTAINING A PHENOL SALT-AMINE COMPLEX AND, OPTIONALLY, A FATTY ACID SALT
Tsuzuku Yamamoto, Kazuo Senda, Akira Ichikawa, and Takao Ohzeki, Ohtake-shi, Masakazu Honda, Mitaka-shi, and Shigenobu Masunaka and Minoru Sasaki, Ohtake-shi, Japan, assignors to Mitsubishi Rayon Co., Ltd., Tokyo, Japan, a corporation of Japan
No Drawing. Filed Dec. 21, 1964, Ser. No. 420,123
Claims priority, application Japan, Dec. 23, 1963, 38/69,339; Aug. 24, 1964, 39/48,246; Sept. 26, 1964, 39/55,149
Int. Cl. C08f 45/00
U.S. Cl. 260—23
8 Claims

ABSTRACT OF THE DISCLOSURE

Polypropylene fibers modified with a metal phenolate derivative wherein the metal forms a coordinate bond with the nitrogen of ammonia, an aliphatic primary amine, an aromatic amine or a nitrogen-containing heterocyclic compound and, alternatively, modified also with a nickel or zinc carboxylate, which fibers possess superior affinity for dyestuffs capable of forming a coordinate bond with said metal.

---

This invention relates to dyeable polypropylene fibers which possess superior affinity for dyestuffs capable of forming coordinate bond with metals. More particularly this invention relates to modified polypropylene fibers containing metallo organic compounds consisting mainly of metal phenolate derivatives, and possessing superior affinity for dyestuffs capable of forming coordinate bond with the said metal and various superior properties as a textile fiber.

Though polypropylene fibers possess superior physical and mechanical properties, they are, on the other hand, hardly dyeable with the commonly known dyestuffs and dyeing methods because of their extremely hydrophobic and chemically inert property and the lack of dyeing sites having affinity for dyestuffs. In order to overcome this drawback, there have been proposed various methods; for example graft copolymerization of various vinyl monomers possessing affinity for dyestuffs onto polypropylene fibers, blend-spinning with high molecular or low molecular compound possessing affinity for dyestuffs, chemical treatment of polypropylene fibers so as to give dyeability, development of novel dyestuffs for polypropylene and so forth.

An object of the present invention is to provide polypropylene fibers possessing high grade of whiteness, superior dyeability and light fastness and high weather resistance while retaining various superior mechanical properties inherent to polypropylene.

The dyeing method which is characterized by incorporating an inorganic metal salt in fibers followed by dyeing with dyestuffs capable of bonding with the said metal has been known as mordant dyeing. However, since polypropylene possesses no affinity for inorganic metal salts, this method can hardly be applied to polypropylene fibers. Even applied, it is impossible to make a sufficient amount of metal salt be adsorbed onto polypropylene fibers from aqueous solution. On this account, dyeing achieved is of only light color, and the dyed products are easily discolored by washing or the like. Accordingly the dyed products possessing practical value cannot be obtained. If polypropylene were blended with an inorganic metal salt, this composition shows very poor spinnability or processability and gives no good fibers, because of the lack of affinity or compatibility between the metal salt and polypropylene. Furthermore since such inorganic metal salts generally promote decomposition of polypropylene on heat or oxidation, it lowers weather resistance, heat resistance or oxidation stability of fibers.

British Patent 932,897 and United States Patent 2,984,634 disclosed the methods which are characterized by blending organic metal salts e.g. metal salts of higher aliphatic carboxylic acid such as nickel stearate, zinc stearate or the like. It is possible according to these methods to obtain fibers possessing superior fiber properties and good dyeability for dyestuffs capable of forming coordinate bonds with the metals. However fibers produced by these methods have only weak resistance against light, heat and oxidation. Accordingly these fibers readily lose their superior mechanical properties and so the practical value.

In order to obtain metal-containing dyeable polypropylene fibers having no such drawbacks we have made studies on various metallo organic compounds and found that fibers obtained by incorporating a compound represented by following general Formula I into polypropylene, followed by spinning, possess superior fiber properties, affinity for dyestuffs capable of forming coordinate bonds with metals and weather resistance.

General Formula I

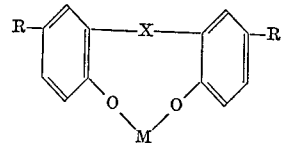

In this general formula, R is an alkyl radical having from 4 to 18 carbon atoms, X is a member selected from the group consisting of S, SO, $SO_2$, $CH_2$ and O and M is a metal selected from the group consisting of Ni, Zn, Co, Cu and Pb.

The melting points of the compounds expressed by the above-mentioned general formula are higher than the spinning temperature of polypropylene. Accordingly, these compounds must be finely ground on blending with polypropylene. When compounds ground to considerably fine powder are used, resulting fibers are passable as common dyeable fibers, but colored spots are observed in the cross-section of dyed fibers by microscope. This heterogeneity brings about some defects into the fibers and lowers their superior fiber properties.

According to the present invention, at least one of the compounds represented by following general Formula II is incorporated into polypropylene and subjected to spinning to solve the above-mentioned problems.

General Formula II

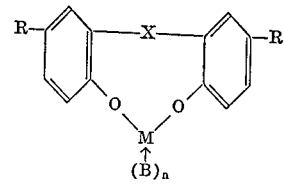

In this general formula, R is an alkyl radical having from 4 to 18 carbon atoms, X is a member selected from the group consisting of SO, $SO_2$, $CH_2$ and O, M is a metal atom selected from the group consisting of Ni, Zn, Co, Cu and Pb, B is a member selected from the group consisting of $NH_3$, aliphatic primary amines, aromatic amines and nitrogen containing heterocyclic compounds, and $n$ is an integer of 1 or 2.

In some cases, addition of at least one compound represented by the following general Formula III is preferable:

$$(R_1COO)_2M_1 \qquad (III)$$

where $R_1$ is an alkyl radical having from 7 to 29 carbon atoms and $M_1$ is a metal selected from the group consisting of Ni and Zn. When one of the compounds represented by the general Formula II is blended with polypropylene and subjected to spinning, it is also possible to improve whiteness and dyeability of fibers, brightness and various fastnesses of dyed products effectively by simultaneous use of at least one of the compounds represented by the general Formula III. Namely the object of the present invention can be attained by blend-spinning of polypropylene with at least one of the compounds represented by the general Formula II but also attained more effectively by adding at least one of the compounds represented by the general Formula III to the above-mentioned system.

The amount of compounds represented by the general Formula II to be added to polypropylene in the present invention is from 0.1 to 10 percent by weight preferably from 0.5 to 5 percent by weight of polypropylene. When the amount of addition is increased in this case, dyeability and weather resistance are improved but the amount of more than 10 percent by weight is not favorable because it reduces various mechanical properties of fibers and increases the cost of the fibers. The amount of less than 0.1 percent by weight does not give improvement over unmodified polypropylene both on dyeability and weather resistance. By the addition of 0.1 percent by weight weather resistance can be improved but the improvement of dyeability is not sufficient. For the purpose of improving both properties sufficiently, the addition of more than 0.5 percent is necessary. According as the amount of addition is increased, the efficiency of the added compound is lowered and the addition of more than 5 percent by weight does not show notable improvement over the addition of 5 percent by weight in the point of dyeability and weather resistance. Considering the cost and mechanical properties of fibers, the addition of less than 5 percent is rather preferable.

The amount of compound expressed by the general Formula III to be added in the present invention is preferably from 0.5 to 5 percent by weight. When the improvement of the whiteness of fibers, and disperity of the compounds represented by the general Formula II are aimed at, the greater amount of addition may be preferable, but too much addition reduces mechanical properties of the fibers. Accordingly it is preferable to use as small an amount as possible. Generally speaking it is preferable that the addition of compound represented by the general Formula III does not exceed that of compound represented by the general Formula II.

In the practice of the present invention, various common antioxidants for polypropylene such as phenol derivatives, amine derivatives or the like, synergistic agent such as dilauryl thiodipropionate, trioctadecyl phosphite or the like, titanium oxide, dispersing agent, surface active agent and other additives can be effectively used. The production of fibers from polypropylene composition consisting of the compounds represented by the general Formulas II and III and above-mentioned additives can be carried out by any of the spinning processes, i.e. melt spinning process, dry spinning process and wet spinning process.

On the fibers produced by the present invention, dyestuffs which are capable of bonding with metals in the general Formula II by coordinate bond and/or salt forming bond can be used. Namely the dyestuffs which are useful for the fibers produced by the present invention, besides those known generally as mordant dyes, include those which are developed particularly for polypropylene, containing no hydrophilic groups in their molecules and possessing such a group as to unite with metals by coordinate bond, e.g. o-hydroxyazo type, 8-oxyquinoline type, 4-hydroxythiazole type, o-hydroxyazomethyne type and hydroxyanthraquinone type dyestuffs. Representatives of such dyestuffs are "National Polypropylene Dyes," "Koprolene Dyes," "Olefin Dyes" and some of "Mayfon Dyes" and the like. On dyeing, customary methods can be used. If required, a dyeing asssitant such as non-ionic or anionic surface active agents or in some cases, cationic type surface active agent is used, dyeing is carried out at atmospheric pressure and under boiling while maintaining pH at from 2 to 8 (a weak acid is used as a controller). Then beautiful, bright colored objects having superior fastness can be obtained.

Representative compounds belonging to those represented by the general Formula II in the present invention are as follows: (Note: compounds shown hereinafter are those before coordinating the ligand B in the general Formula II.) Nickel salt of di-(2.2′-dihydroxy-5.5′-dibutyl) phenylsulfoxide, nickel salt of di-(2.2′-dihydroxy-5.5′-dibutyl) phenylsulfone, nickel salt of di-(2.2′-dihydroxy-5.5′-dibutyl) phenylmethane, nickel salt of di-(2.2′-dihydroxy-5.5′-dibutyl) phenylether, nickel salt of di-(2.2′-dihydroxy-5.5′-dibutyl) phenylether, nickel salt of di-{(2.2′-dihydroxy-5.5′-di(1.1.3.3.-tetramethyl butyl)}phenylsulfone, nickel salt of di(2.2′-dihydroxy-5.5′-di(1.1.3.3.-tetramethyl butyl)phenyl-sulfoxide, zinc salt of di{2.2′-dihydroxy-5.5′-di-(1.1.3.3.-tetramethyl butyl)}phenyl sulfone, nickel salt of di-{(2.2′-dihydroxy-5.5′-di-(1.1.3.3.-tetramethylbutyl)}phenylmethane, nickel salt of di-{(2.2′-dihydroxy-5.5′-diA1.1.3.3.-tetramethylbutyl)}phenyl ether, nickel salt of di-(2.2′-dihydroxy 5.5′-dioctyl) phenyl sulfone, zinc salt of di-(2.2′-dihydroxy-5.5′-dioctyl) phenyl sulfone, copper salt of di-(2.2′-dihydroxy-5.5′-dioctyl) phenyl sulfone, cobalt salt of di-(2.2′-dihydroxy-5.5′-dioctyl) phenyl sulfone, lead salt of di-(2.2′-dihydroxy-5.5′-dioctyl) phenyl sulfone, and nickel salt of di-(2.2′-dihydroxy-5.5′-dilauryl) phenyl sulfoxide.

Representative compounds which coordinate to abovementioned compounds and belong to nitrogen-containing compound, i.e. ligands B in the general Formula II are as follows; butylamine, octylamine, laurylamine, stearylamine, ethylene diamine, hexamethylene diamine, aniline, phenylene diamine monoethanol amine, pyridine, quinoline and the like.

Such compounds expressed by the general Formula II can be synthesized readily by common synthetic methods of organic chemistry. For example from p-1.1.3.3.-tetramethyl butylphenol and sulfurchloride, di-{2.2′-dihydroxy-5.5′-di-(1.1.3.3.-tetramethylbutyl)} phenyl sulfide can be obtained. If oxidized with hydrogen peroxide, sulfoxide or sulfone is obtained according to a number of moles of hydrogen peroxide used and reaction condition. Di-{2.2′-dihydroxy - 5.5′ - di-(1.1.3.3.-tetramethylbutyl)} phenyl methane is obtained from salicyl alcohol by alkylating the latter with isobutylene, and heating the resulting 2-hydroxymethyl-5-(1.1.3.3.-tetramethylbutyl) phenol with p-1.1.3.3.-tetramethylbutyl phenol. Resulting phenol derivative is allowed to react with metal salt of inorganic acid or of acetic acid to produce metal salt of phenol. If such metal salt of phenol and nitrogen-containing compound (B) are heated and reacted in the medium such as ethanol or the like, the nitrogen atom forms coordinate bond with the metal atom to produce a compound represented by the general Formula II.

Representatives of the compounds represented by the general Formula III are as follows; zinc stearate, nickel stearate zinc laurate, nickel laurate and the like.

The invention is illustrated but not limited by the following examples.

Example 1

A compound (A) produced by coordinating butyl amine to nickel salt of di-(2.2′-dihydroxy-5.5′-dibutyl) phenyl sulfone and zinc stearate (B) were admixed with crystalline polypropylene having an intrinsic viscosity of 1.4 (measured in tetraline at a temperature of 135° C.) in such proportions as shown in Table 1. Further an oxidation stabilizer was added. The resulting mixture was made into pellets at a temperature of 220° C., subjected to spinning at a temperature of 260° C. according to the customary melt-spinning process and resulting filaments were stretched 5 times the original length at a temperature of 130° C. The filaments were subjected to scouring, dyeing and soaping according to the following conditions of (a), (b) and (c). Properties of fibers and results of dyeing are shown in Table 1.

(a) Scouring condition:
Bath:
"Scourol #400" _____ g./l__ 0.5
Na-pyrophosphate _____ g./l__ 0.1
Liquor ratio _____ 1:50
Temperature _____ °C___ 70
Time _____ minutes____ 30

After treated, filaments were washed with water, dried, and subjected to dyeing.

(b) Dyeing condition:
Dyestuff ("National Polypropylene Dark Blue 2BM") _____ 5 percent OWF It is presumed that this dyestuff has the following chemical structural formula:

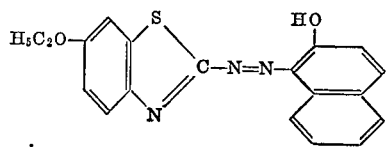

Dispersing agent:
Mypo D _____ g./l__ 1
Glacial acetic acid _____ g./l__ 0.2
Liquor ratio _____ 1:50
Temperature _____ C___ 98°

After dyeing, filaments were washed with water and subjected to soaping.

(c) Soaping condition:
Scourol #400 _____ g./l__ 0.5
Sodium carbonate _____ g./l__ 0.1
Liquor ratio _____ 1:50
Temperature _____ °C__ 70
Time _____ minutes__ 20

After treated, filaments were washed with water and dried.

exposure of a weather-o-meter for 300 hours. Retention of tenacity were as follows: No. 1, 90%; No. 2, 93%; and No. 3, 54%; dyeable polyproplene fibers of the present invention proved their superiority.

Example 2

Compounds produced by coordinating butyl amine (D), lauryl amine (E), hexamethylene diamine (F), aniline (G) and pyridine (H) to nickel salt of di-{2.2'-dihydroxy-5.5'-di(1.1.3.3-tetramethylbutyl)} phenyl sulfone (C) were admixed with crystalline polypropylene having an intrinsic viscosity of 2.2 in proportions of each 1.5 percent by weight respectively. Filaments were produced and dyed by the same method as in Example 1. Various properties measured are shown in Table 2.

TABLE 2

| No. | Additives | Dry strength (g./d.) | Elongation (percent) | Exhaustion (percent) | Fastness (grade) | |
|---|---|---|---|---|---|---|
| | | | | | Light | Washing |
| 4 | C | 6.25 | 30.4 | 85 | More than 6 | 4-5 |
| 5 | C-D | 6.55 | 29.5 | 94 | do | 4-5 |
| 6 | C-E | 6.70 | 28.0 | 91 | do | 5 |
| 7 | C-F | 6.32 | 29.9 | 89 | do | 5 |
| 8 | C-G | 6.88 | 30.4 | 96 | do | 4-5 |
| 9 | C-H | 6.50 | 32.4 | 88 | do | 4-5 |

Symbols in the column of additives mean that the compound C was coordinated with ligands corresponding to the letters D–H. No. 4 is a control.

When the cross sections of dyed filaments thus produced were observed, under a microscope, dyed points in the filaments No. 4 were spotted, but in other filaments the dyeing was carried out evenly and there were no such spots observed. The color tones of dyed products other than No. 4 were all bright.

Example 3

Zinc salt of di-[2,2'-dihydroxy-5,5'-di-(1,1,3,3-tetramethylbutyl)] phenyl sulfone (I) and nickel stearate (J) were admixed with crystalline polypropylene having an intrinsic viscosity of 1.4 in such proportions as shown in Table 3. Further antioxidant and synergestic agent were added. Filaments were obtained as in Example 1. Using "National Polypropylene Brilliant Violet 3RM" as a dyestuff—it is presumed that this dyestuff has the following chemical structural formula:

TABLE 1

| | Additives (percent) | | Dry strength (g./d.) | Dry elongation (percent) | Whiteness (percent) | | Exhaustion (percent) | Fastness (grade) | |
|---|---|---|---|---|---|---|---|---|---|
| | A | B | | | Y | PI | | Light | Washing |
| Number: | | | | | | | | | |
| 1 | 1.5 | 0 | 5.41 | 30.0 | 80.5 | 93.0 | 94 | (¹) | 4-5 |
| 2 | 1.0 | 0.5 | 5.62 | 28.0 | 80.9 | 96.4 | 96 | (¹) | 4-5 |
| 3 | 0 | 1.0 | 4.93 | 32.4 | 82.2 | 96.0 | 89 | 3 | 5 |

¹ More than 6.

The whiteness was measured by a recording spectrophotometer and expressed by values of Y and PI, the light fastness was determined by the carbon arc method (fadeometer) according to Japanese Industrial Standard JIS-L-1044 (1959) and the washing fastness was by the beaker method BC-2 according to JIS-L-1045 (1959). Further these three kinds of filaments were subjected to

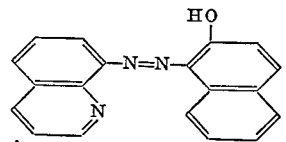

—the same dyeing experiments as in Example 1 were carried out. The results were shown in Table 3.

TABLE 3

| No. | Additives (percent) | | | | Dry strength (g./d.) | Elongation (percent) | Exhaustion (percent) | Fastness (grade( | |
|---|---|---|---|---|---|---|---|---|---|
| | I | I' | I'' | J | | | | Light | Washing |
| 10 | 1.5 | 0 | 0 | 0 | 5.02 | 30.1 | 84 | 2 | 5 |
| 10' | 0 | 1.5 | 0 | 0 | | | 92 | 2 | 5 |
| 10'' | 0 | 0 | 1.5 | 0 | | | 94 | 2 | 5 |
| 11 | 1.5 | 0 | 0 | 0.5 | 5.24 | 28.5 | 96 | 6 | 5 |
| 12 | 0 | 0 | 0 | 1.5 | 5.42 | 27.1 | 92 | (¹) | 4 |

¹ More than 6.

In Table 3, Nos. 10, 11 and 12 were controls.

Though in No. 10′ the exhaustion is considerably improved when compared with No. 10, the exhaustion in No. 10″ is not so much improved when compared with No. 10′. It is seen from this fact that by coordinating amine to (I), the dispersibility of (I) in polypropylene is improved and as a result the dyeability is improved, but such effect is not considerably influenced by the amount of amine to be coordinated to (I). Compared with the case of No. 10, the light fastness was increased in the case of No. 11. Though the brightness of color of dyed products was low in No. 12, it was high in No. 11.

Example 4

Using a compound (K) obtained by coordinating butylamine to the compound (I) in Example 3 and with the same other condition as in Example 3, filaments were produced and subjected to dyeing experiments whereby the result shown in Table 4 was obtained.

TABLE 4

| No. | Additives (percent) K | Additives (percent) J | Dry strength (g./d.) | Elongation (percent) | Exhaustion (percent) | Fastness (grade) Light | Fastness (grade) Washing |
|---|---|---|---|---|---|---|---|
| 13 | 1.5 | 0 | 5.35 | 30.1 | 89 | 3-4 | 5 |
| 14 | 1.5 | 0.5 | 5.45 | 31.0 | 95 | 6 | 5 |

The cross sections of dyed filaments shown in Table 4 were observed under a microscope and compared with the result of Nos. 10 and 11 in Example 3. In No. 10 and 11, dyed points were distributed in spots. Particularly in No. 10 the dyestuff was adsorbed only on these points. On the other hand the whole cross sections were dyed evenly in the cases of Nos. 13 and 14 and there were observed no spots. In the case of No. 12 in Example 3 there was a tendency of ring dyeing though no spots were observed. It was clarified, accordingly, that the present method was much more superior than that of Nos. 10 and 11

Example 5

Compounds shown hereinafter (M–O) and zinc stearate (B) and further antioxidants were admixed with crystalline polypropylene having an intrinsic viscosity of 2.2. Filaments were produced as in Example 1 and using as a dyestuff "Olefin Violet 15616"—it is presumed that this dyestuff has the following chemical structural formula:

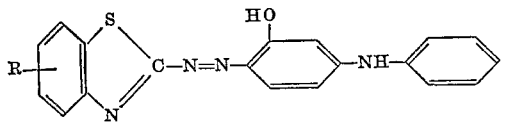

The dyeing experiments were carried out as in Example 1 whereby the results shown in Table 5 were obtained.

TABLE 5

| Number: | Additives (percent) | Dry strength (g./d.) | Elongation (percent) | Whiteness Y (percent) | Whiteness PI (percent) | Exhaustion (percent) | Fastness (grade) Light | Fastness (grade) Washing |
|---|---|---|---|---|---|---|---|---|
| 17 | M, 1.5 | 6.70 | 26.0 | 77.7 | 90.5 | 79 | More than 6 | 4 |
| 18 | M, 1.5; B, 0.5 | 6.78 | 25.1 | 81.2 | 96.1 | 86 | do | 5 |
| 19 | N, 1.5 | 6.42 | 29.8 | 79.9 | 91.8 | 89 | do | 4-5 |
| 20 | O, 1.5 | 6.68 | 27.5 | 80.9 | 92.2 | 85 | do | 4-5 |

Alphabets M, N, O in the column of additives in Table 5 indicate following compounds:

M—nickel salt of di-{2.2′-dihydroxy-5.5′-di-(1.1.3.3.-tetramethyl butyl)} phenyl sulfoxide coordinated with butyl amine, N—nickel salt of di-2.2′-dihydroxy-5.5′-di-(1.1.3.3.-tetramethyl butyl) phenyl methane coordinated with butyl amine, O—nickel salt of di-{2.2′-dihydroxy-5.5′-di-(1.1.3.3.-tetramethyl butyl)} phenyl ether coordinated with butyl-amine. It was observed in the case of Nos. 16 and 18 that the whiteness of filaments prior to dyeing was particularly improved.

Example 6

Melting points of nickel salts of di-{2.2′-dihydroxy-5.5′-di-(1.1.3.3.-tetramethylbutyl)} phenyl sulfone coordinates with various nitrogen-containing compounds were measured, of which the result is shown in Table 7.

TABLE 7

| Number: | Nitrogen-containing compound | Melting points, ° C. |
|---|---|---|
| 1 | None | 360 |
| 2 | Butyl amine | 170-175 |
| 3 | Lauryl amine | 115-117 |
| 4 | Stearyl amine | 60-64 |
| 5 | Hexamethylene diamine | 280-295 |
| 6 | Pyridine | 210-220 |
| 7 | Aniline | 165-170 |

We claim:

1. Dyeable polypropylene fibers consisting of polypropylene and from 0.1 to 10 percent by weight of at least one kind of modifying agent represented by general Formula II.

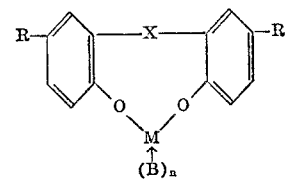

wherein R is an alkyl radical having from 4 to 18 carbon atoms, X is a member selected from the group consisting of SO, SO₂, CH₂ and O, M is a metal atom selected from the group consisting of Ni, Zn, Co, Cu and Pb, B is a member selected from the group consisting of NH₃, aliphatic primary amines, aromatic amines, and nitrogen-containing heterocyclic compounds and $n$ is an integer of 1 or 2.

2. Dyeable polypropylene fibers consisting of polypropylene and from 0.1 to 10 percent by weight of at least one kind of modifying agent represented by general Formula II and from 0.5 to 5 percent by weight of supplementary modifying agent represented by general Formula III $(R_1COO)_2M_1$, wherein $R_1$ is an alkyl radical having from 7 to 29 carbon atoms and $M_1$ is a metal atom selected from the group consisting of Ni and Zn.

3. Dyeable polypropylene fibers according to claim 1 wherein the amount of modifying agent is from 0.5 to 5 percent by weight.

4. Dyeable polypropylene fibers according to claim 2 wherein X is a member selected from the group consisting of SO and SO₂, M is a metal atom selected from the group consisting of Ni and Zn, B is a member selected from the group consisting of NH₃, aliphatic primary amine, aromatic amine, nitrogen-containing heterocyclic compound, $n$ is an integer of 1 or 2.

5. Dyeable polypropylene fibers according to claim 2 wherein X in general Formula II is $SO_2$, M in general Formula II is Ni, B in general Formula II is nitrogen-containing heterocyclic compound and $M_1$ in general Formula III is Zn.

6. Dyeable polypropylene fibers according to claim 1 wherein B in general Formula II is a member selected from the group consisting of butyl amine, lauryl amine, stearyl amine, hexamethylene diamine, pyridine and aniline.

7. Dyeable polypropylene fibers according to claim 2 wherein B in general Formula II is a member selected from the group consisting of butyl amine, lauryl amine, stearyl amine, hexamethylene diamine, pyridine and aniline.

8. Dyeable polypropylene fibers according to claim 5 wherein B in general Formula II is a member selected from the group consisting of butyl amine, lauryl amine, stearyl amine, hexamethylene diamine, pyridine and aniline.

References Cited

UNITED STATES PATENTS

| | | | |
|---|---|---|---|
| 2,448,799 | 9/1948 | Happoldt et al. | 260—23 |
| 2,971,940 | 2/1961 | Fuchsman et al. | 260—45.75 |
| 2,984,634 | 5/1961 | Caldwell et al. | 260—23 |
| 3,072,601 | 1/1963 | Breslow | 260—45.75 |
| 3,163,492 | 12/1964 | Thomas | 8—55 |
| 3,215,717 | 11/1965 | Foster | 260—439 |
| 3,238,189 | 3/1966 | May et al. | 260—207 |
| 3,240,552 | 3/1966 | Joyner et al. | 8—39 |

FOREIGN PATENTS 932,897    7/1963    Great Britain.

DONALD E. CZAJA, *Primary Examiner.*

R. A. WHITE, *Assistant Examiner.*

U.S. Cl. X.R.

8—55; 260—45.75, 93.7, 94.9